US007984186B2

(12) United States Patent
Perry et al.

(10) Patent No.: US 7,984,186 B2
(45) Date of Patent: *Jul. 19, 2011

(54) METHOD, SYSTEM, AND APPARATUS FOR DISCOVERING USER AGENT DNS SETTINGS

(75) Inventors: R. Scott Perry, Westborough, MA (US); Paul D. Parisi, Boxford, MA (US)

(73) Assignee: DNSstuff, LLC, Newburyport, MA (US)

( * ) Notice: Subject to any disclaimer, the term of this patent is extended or adjusted under 35 U.S.C. 154(b) by 294 days.

This patent is subject to a terminal disclaimer.

(21) Appl. No.: 12/198,495

(22) Filed: Aug. 26, 2008
(Under 37 CFR 1.47)

(65) Prior Publication Data
US 2010/0036969 A1 Feb. 11, 2010

Related U.S. Application Data

(60) Provisional application No. 60/968,179, filed on Aug. 27, 2007.

(51) Int. Cl.
*G06F 15/16* (2006.01)
(52) U.S. Cl. .................. 709/245; 709/220; 709/242
(58) Field of Classification Search .................. 709/245, 709/227–228
See application file for complete search history.

(56) References Cited

U.S. PATENT DOCUMENTS

| | | | |
|---|---|---|---|
| 2003/0131076 A1* | 7/2003 | Nelson et al. | 709/219 |
| 2004/0215707 A1* | 10/2004 | Fujita et al. | 709/201 |
| 2005/0111384 A1* | 5/2005 | Ishihara et al. | 370/254 |
| 2006/0031514 A1* | 2/2006 | Bousis | 709/227 |
| 2007/0160200 A1* | 7/2007 | Ishikawa et al. | 380/30 |
| 2009/0070474 A1* | 3/2009 | Aura et al. | 709/228 |

* cited by examiner

*Primary Examiner* — Salad Abdullahi
(74) *Attorney, Agent, or Firm* — Mark Leonardo; Lillian Horwitz; Brown Rudnick LLP

(57) ABSTRACT

A method, system and apparatus including receiving a request from a network device, the request including an IP address of said network device, generating and sending to the network device a domain name for locating a device configured to process a DNS query, the domain name corresponding to the IP address, the network device generating and sending a DNS query including the domain name and at least one local DNS setting of the network device to the device configured to the process the DNS query, and the device processing an association between the IP address and the at least one local DNS setting of the network device.

18 Claims, 7 Drawing Sheets

162

| URL/Env Var | IP Address | DNS Setting | TTL | Nameserver | Namespace |
|---|---|---|---|---|---|
| http://dns.com | 3.14.15.9 | 2.4.6.8 | 5 | ns.here.com | ICANN |
| ftp://ipdns.com | 2.78.18.2 | 1.3.5.7 | 8 | ns2.there.com | Private |
| http://ip.dns | 1.41.42.1 | 2.3.4.5 | 3 | dns.client.com | Alternate |

METHOD, SYSTEM, AND APPARATUS FOR DISCOVERING USER AGENT DNS SETTINGS

BACKGROUND OF THE INVENTION

The present invention generally relates to a device communication, and more particularly, relates to a method, system, and product for discovering a communication between user agents and DNS devices.

A user agent is application software under control of a user which accesses, manipulates, displays, and supports navigation within information from its environment, such as on a computer network. Typically, the application software is used to access resources made available via various protocols. Application software includes, but is not limited to, desktop graphical browsers, text browsers, voice browsers, mobile phones, multimedia players, plug-ins, and some software assistive technologies used in conjunction with browsers such as screen readers, screen magnifiers, and voice recognition software.

Domain Name System (DNS) is an Internet protocol and service that translates hostnames and domain names into Internet Protocol (IP) addresses. The domain name www.example.com might translate to 192.168.1.1, for example. The DNS is its own network. If one DNS server does not know how to translate a particular domain name, it asks another one, and so on, until the correct IP address is acquired. A client, consumer, user or generally anyone that utilizes DNS may be called a resolver; resolvers may be located in the application layer of the networking software of each Transmission Control Protocol/Internet Protocol (TCP/IP) capable entity. User agents that use the DNS rely heavily on the resolver. Communications are made to the DNS based upon the user agent's DNS settings which in turn handles the communications required.

The Web is based on the concept of hypertext and a transfer method known as Hypertext Transfer Protocol (HTTP) which is designed to run primarily via TCP/IP connections. HTTP permits user agents of client systems connected to networks to access independent and geographically scattered systems also connected to the Internet. User agent requests for data are made by means of an HTTP request. An HTTP request is information that a user agent sends to an entity containing the details of what the user agent wants and will accept back. An HTTP response is information that an entity sends back to the user agent in response to receiving an HTTP request. These transmissions may contain environment variables which provide information about the entities involved. Much of this information may be contained in the headers of the HTTP request and may include the client IP address and identification of the user agent. However there are no protocols that specify including current DNS settings of the client user agent as an environmental variable. Therefore, a server has no way to learn of both the IP address and current DNS settings from the request made by the client user agent.

SUMMARY OF INVENTION

The present invention enables an entity that answers network requests to discover and store an association between a requesting user agents IP address and its DNS settings. The present invention enables an entity that responds to network requests to notify a requesting entity of the reputation of the requesting entities DNS settings. The present invention enables a server to deny network resource access to user agents having unapproved DNS settings. The present invention enables remote entities to validate IP address lists contained in, but not limited to, the requesting entities DNS settings.

In general, in accordance with the present invention, a method includes an entity receiving a request from another entity, a request including the IP address of the entity, generating and providing a domain name for locating an entity configured to at least one of a store, forward, analyze, monitor, validate, authenticate, and/or process a DNS query, a domain name corresponding to the IP address of the entity receiving the request causing the entity to query the responding entity for resolution of DNS information where the receiving entity correlates, stores and/or organizes the request of the requesting entity with other information about the requesting entity.

In accordance with another aspect of the present invention, a method includes a first entity receiving a first request from a second entity, the first request including an IP address of the second entity, generating a domain name for locating a DNS server, the domain name corresponding to the IP address of the first entity, sending the domain name to the second entity, the second entity generating a second request including the domain name and at least one local DNS setting of the second entity, the second entity sending the second request to the indicated DNS server, the first entity storing an association between the IP information and the at least one DNS setting of the second entity.

In accordance with yet another aspect of the present invention, a method includes a first entity receiving a first request from a second entity, the first request including an IP address of the second entity, the first entity generating and sending a content to the second entity, the content including a domain name for locating a DNS server, the domain name corresponding to the IP address of the first entity. The second entity generating and sending a second request to a DNS server, the second request including the domain name and at least one DNS setting of the second entity, and the DNS server storing and forwarding an association between the IP address and the at least one DNS setting.

In accordance with an additional aspect of the present invention, an entity or a system includes a first entity, a DNS server configured to store an association between an IP address and at least one DNS setting of a second entity and a third entity, a content server in operative association with the first entity, the third entity configured to receive a first request for a first content from the third entity, the first request including a first domain name to locate the third entity and the IP address of the first entity, generate a second content including a second domain name to locate the first entity, a DNS server, the second domain name corresponding to the IP address and the first domain name, and send the first content and the second content to the first entity wherein the first entity is configured to generate a second request including the second domain name and the at least one DNS setting, and send the second request to the third entity.

In accordance with other additional aspects of the present invention, a computer-readable medium that includes computer-executable instructions may be used to perform substantially the same methods as those described above is provided.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

BRIEF DESCRIPTION OF DRAWINGS

FIG. 2 a diagram depicting a data structure of an IP/DNS file database;

DETAILED DESCRIPTION

Figure 1A:
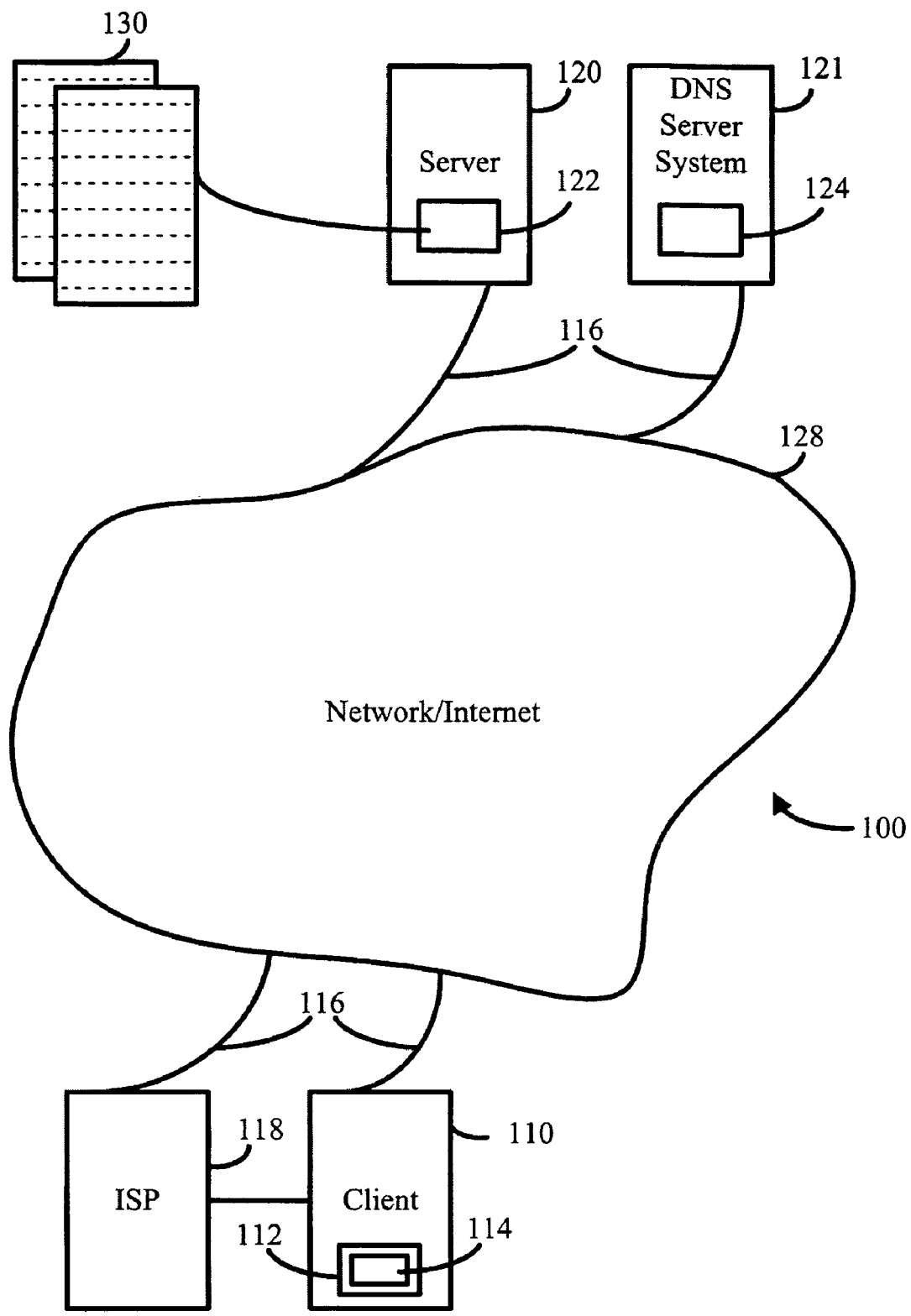
FIG. 1a is a block diagram of a distributed computer system in accordance with an embodiment of the present invention.

The present invention is described with reference to the drawings, wherein like reference numerals are used to refer to like elements throughout.

Myriads of new applications and services may be developed if an entity was configured to learn the association between the IP address and current DNS settings via the resource request of the client user agent. Accordingly, there is a need for a system to remotely discover a user agent's current DNS configuration.

FIG. 1a illustrates an exemplary system for providing a distributed system 100 in accordance with an embodiment of the present invention and may include client computers or any network access apparatus 110 connected to computers 120 via a network 128. The distributed system 100 may include client computers or any network access apparatus 110 connected to computers 120 via a network 128. The network 128 may use Internet communications protocols (IP) to allow clients 110 to communicate with computers 120. The communication device of a network access apparatus 110 may include a transceiver, a modem, a network interface card, or other interface devices to communicate with the network 128. The network access apparatus 110 may be in operative association with and/or include a Global Positioning System (GPS) receiver. A communication with the network 128 via a line 116 such as a telephone line, an ISDN line, a coaxial line, a cable television line, a fiber-optic line, or a computer network line. Alternatively, the communication may be made wirelessly with the network 128. The network 128 may be accessed by any client device via a direct connection, an Internet Service Provider (ISP) 118, an on-line service, a local area network service, a wide area network service, a cable television service, a wireless service, an intranet, a virtual private network, a peer-to-peer network, a satellite service, or the like. Communication links that are used to connect the various systems depicted throughout the present invention may be of various types including hardwire links, optical links, satellite or other wireless communications links, wave propagation links, or any other mechanisms for communication of information.

Client computers 110 may be any network access apparatus including hand held devices, palmtop computers, personal digital assistants (PDAs), notebook, laptop, portable computers, desktop PCs, workstations, and/or larger/smaller computer systems. It is noted that the network access apparatus 110 may have a variety of forms, including but not limited to, a general purpose computer, a network computer, a network television, an internet television, a set top box, an IP-enabled telephone, an internet appliance, a portable wireless device, a television receiver, a game player, a video recorder, and/or an audio component, for example. Each client 110 typically includes one or more processors 140, memories 144, and input/output devices 148 (not shown).

The computers 120 may be similarly configured. However, in many instances, sites 120 may include many computers, perhaps connected by a separate private network. In fact, the network 128 may include hundreds of thousands of individual networks of computers. One embodiment of the present invention includes a specific type of computer system called a DNS server system 121 which stores in memory and on disk (and other means) a database 124 having DNS records (resource records) that translate domain names into IP addresses and vice versa. The DNS server system 121 is connected 116 to network 128. The DNS is a distributed database (of mappings) 124 implemented in a hierarchy of DNS servers (name servers) 121 and an application-layer protocol that allows hosts and name servers to communicate in order to provide the translation service. Name servers 121, for example, may resemble, but is not limited to, UNIX machines running BIND software. In order to deal with an issue of scale, for example, of the Internet, the DNS uses a large number of name servers 121, organized in a hierarchical fashion and distributed around the world. No single name server 121 has all of the mappings 124 for all of the hosts on the Internet. Instead, the mappings 124 are distributed across many name servers 121.

Although the client computers 110 are shown separate from the server computers 120, it should be understood that a single computer may perform the client and server roles simultaneously. Those skilled in the art will appreciate that the computer environment 100 shown in FIG. 1a is intended to be merely illustrative. The present invention may also be practiced in other computing environments. For example, the present invention may be practiced in multiple processor environments wherein the client computer includes multiple processors. Moreover, the client computer need not include all of the input/output devices as discussed above and may also include additional input/output devices. Those skilled in the art will appreciate that the present invention may also be practiced with Intranets and more generally, in distributed environments in which a client computer requests resources from other computers or itself.

During operation of the distributed system 100, clients 110 may access information records 122 stored by the servers 120 while utilizing, for example, the Web. The records of information 122 may be in the form of Web pages 130. The pages 130 may be data records including as content plain textual information, or more complex digitally encoded multimedia content, such as software programs, graphics, audio signals, videos, and so forth. It should be understood that although this description focuses on locating information on the World-Wide-Web, the system may also be used for locating information via other wide or local area networks (WANs and LANs), or information stored in a single computer using other communications protocols.

The clients 110 may execute user agents 112 such as web browser programs to locate the pages or records 130. The browser programs enable users to enter addresses of specific Web pages 130 to be retrieved. Typically, the address of a Web page is specified as a Uniform Resource Identifier (URI) or more specifically as a Uniform Resource Locator (URL). In addition, when a page has been retrieved, browser programs may provide access to other pages or records by "clicking" on hyperlinks (or links) to other Web pages or data. Such links may provide an automated way to enter the URL of another page, and to retrieve that page.

A client of the DNS is typically called a resolver 114. Resolvers 114 are typically located in the application layer of the networking software of each TCP/IP capable machine. Users typically do not interact directly with the resolver 114. Resolvers 114 query the DNS by directing queries at name servers, which contain parts of the distributed database that is accessed by using the DNS protocols to translate domain names into IP addresses needed for transmission of information across the network. DNS is commonly employed by other application-layer protocols—including HTTP, SMTP and FTP—to translate user-supplied domain names to IP addresses. When a user agent 112 (e.g., an HTTP client) requests a URL having a resolvable domain name, in order for the computer to be able to send an HTTP request message to a computer 120, the user agent must obtain the IP address related to that specific resolvable domain name. The user agent runs the resolver 114 (DNS client) as the client-side of the DNS application. The user agent 112 extracts the domain name from the URL and passes the domain name to the resolver 114 as the client-side of the DNS application. As part of a DNS query message, the DNS client 114 sends the domain name to a DNS server system 121. The DNS client 114 eventually receives a reply, which includes the IP address for the domain name in question. The browser then opens a TCP connection 116 to the HTTP server 120 located at the IP address.

Figure 1B:
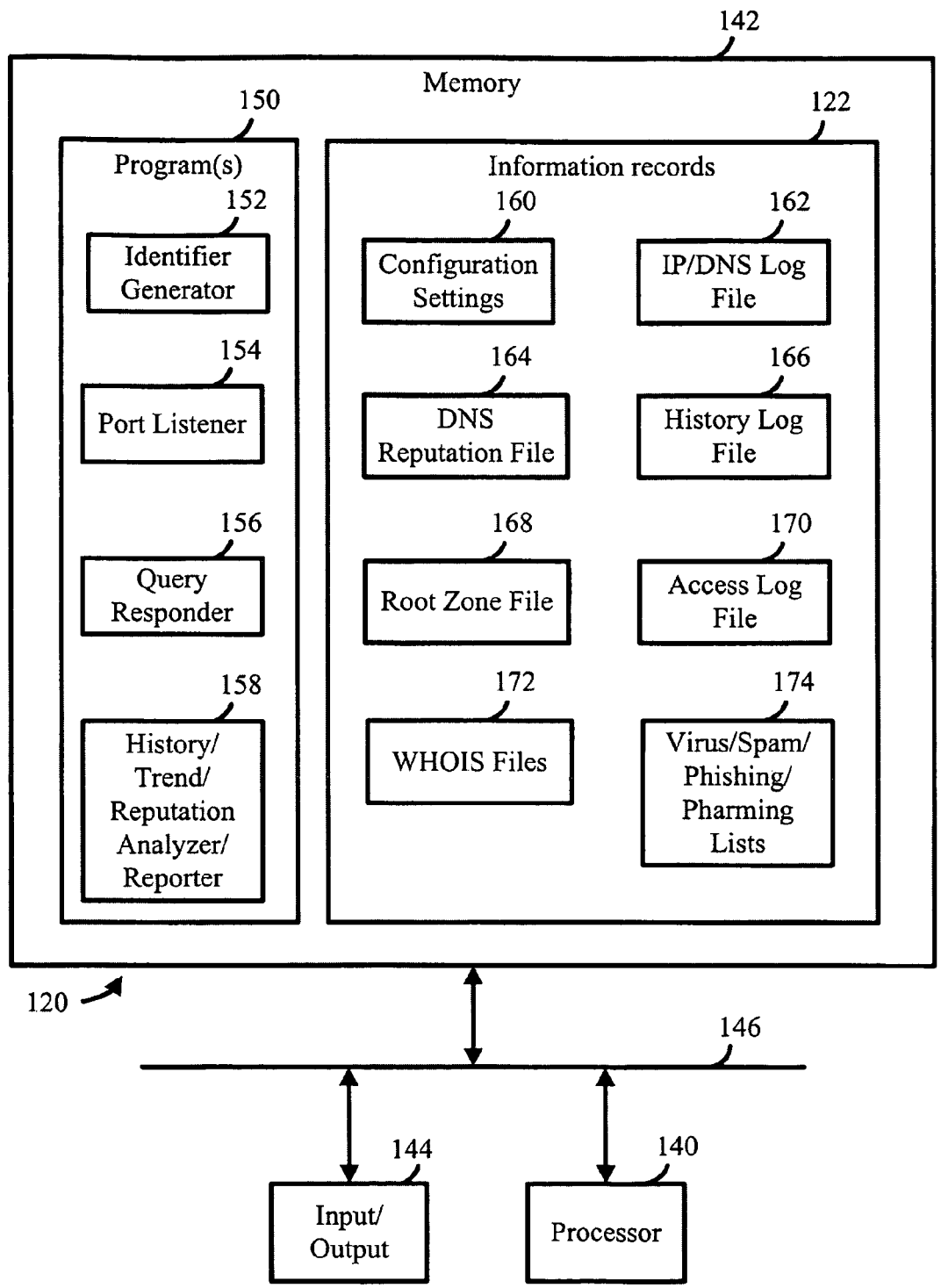
FIG. 1b is an illustration of a block diagram of programs and exemplary information records stored in memory in accordance with an embodiment of the present invention.

FIG. 1b illustrates a block diagram of a computing device in accordance with an embodiment of the present invention. A computing device having a storage device such as memory 144 and/or storage medium 146 is in operative association with a processor 140 and input/output devices 148 via at least one data bus 142. Such a computing device may operate in a self-contained or standalone capacity or in any combination as a client 110 and/or server 120 computing system and/or network access device of client/subscriber system 110 or server/provider system 120. Stored in memory 144 may be programs/scripts 150 such as an identifier generator 152, port listener 154, query responder 156, history/trend/reputation analyzer/reporter 158 and information records 122 having any combination of exemplary content such as lists, files, and databases. Such records may include, but are not limited to, for example: configuration setting information 160, IP/DNS log file 162, nameserver reputation file 164, history log file 166, zone files/zone file caches 168, access log files 170, WHOIS files 172 and virus/spam/phishing/pharming lists 174. These information records 122 are further introduced and may be discussed in more detail throughout the disclosure of the present invention.

FIG. 2 illustrates an example of a minimum data structure of the IP/DNS log file database 162. The IP/DNS log file database 162 is updated in step 355 (FIG. 3b) with information such as environment variables including URL and date/time 210, device IP address 212, DNS settings 214, TTL 216, nameserver 218, and namespace provider 220.

Figure 3A:
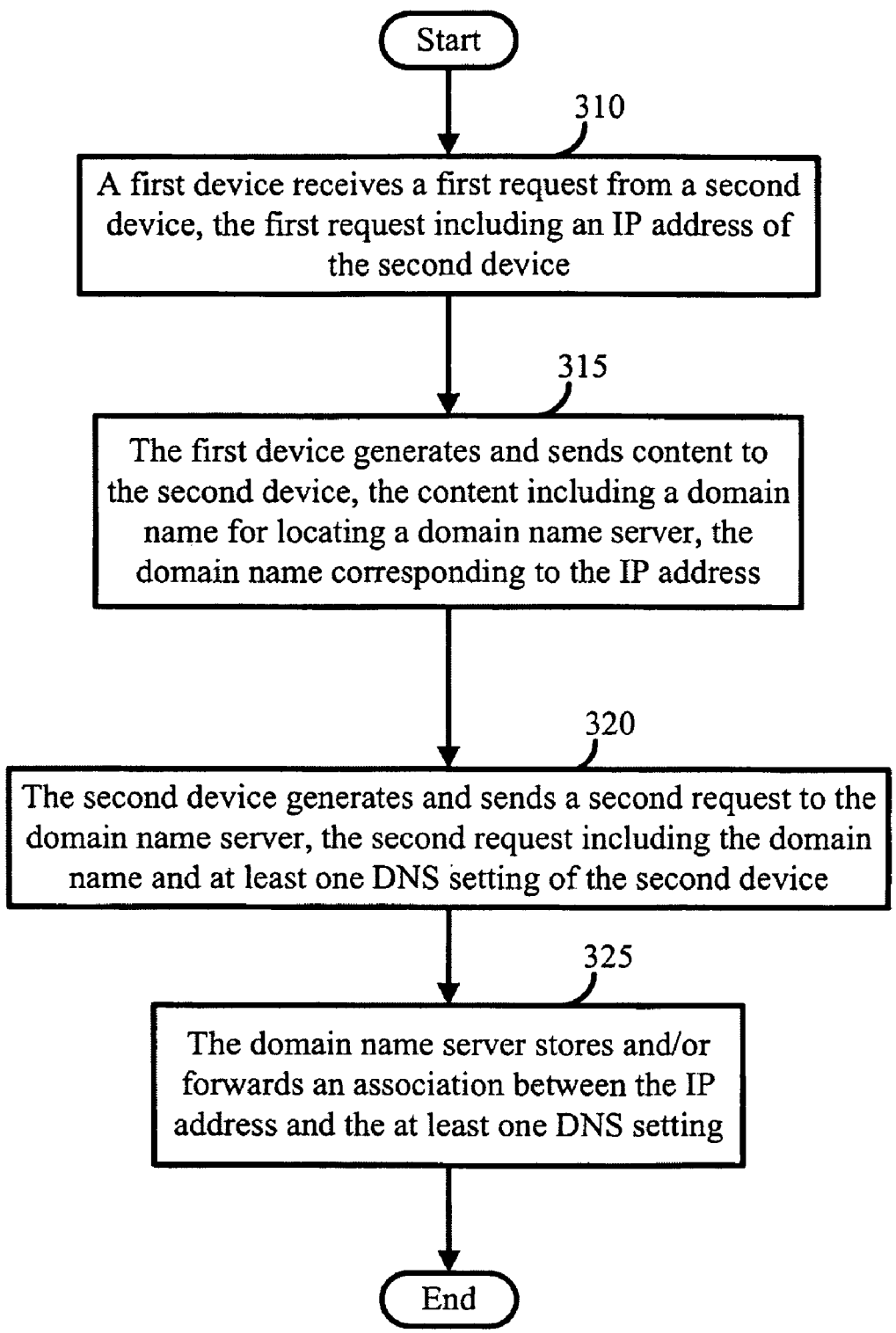
FIG. 3a is a flowchart illustrating the steps performed for accessing a domain name server in response to a network resource request in accordance with an embodiment of the present invention.

FIG. 3a is a flowchart illustrating the steps performed for accessing a domain name server in response to a network resource request in accordance with the present invention. A first device such as a server 120 may receive communication from a second device such as a network access apparatus 110, servlet, applet, stand-alone executable program, or user interface element having a text box object, command line, speech to text interface, location field of a web browser, may receive or intercept and parse input such as text or voice and generate a first request for web content. The server 120 receives, in step 310, a first request from the network access apparatus 110, the first request including an IP address of the network access apparatus 110. The server 120 then generates and sends in step 315 content to the network access apparatus 110, the content including a domain name for locating a DNS server 121, the domain name corresponding to the IP address. The network access apparatus 110 generates and sends in step 320 a second request to the domain name server 121, the second request including the domain name and at least one DNS setting of the network access apparatus 110. The domain name server stores and/or forwards in step 325 an association between the IP address and the at least one DNS setting of the network access apparatus 110.

Figure 3B:
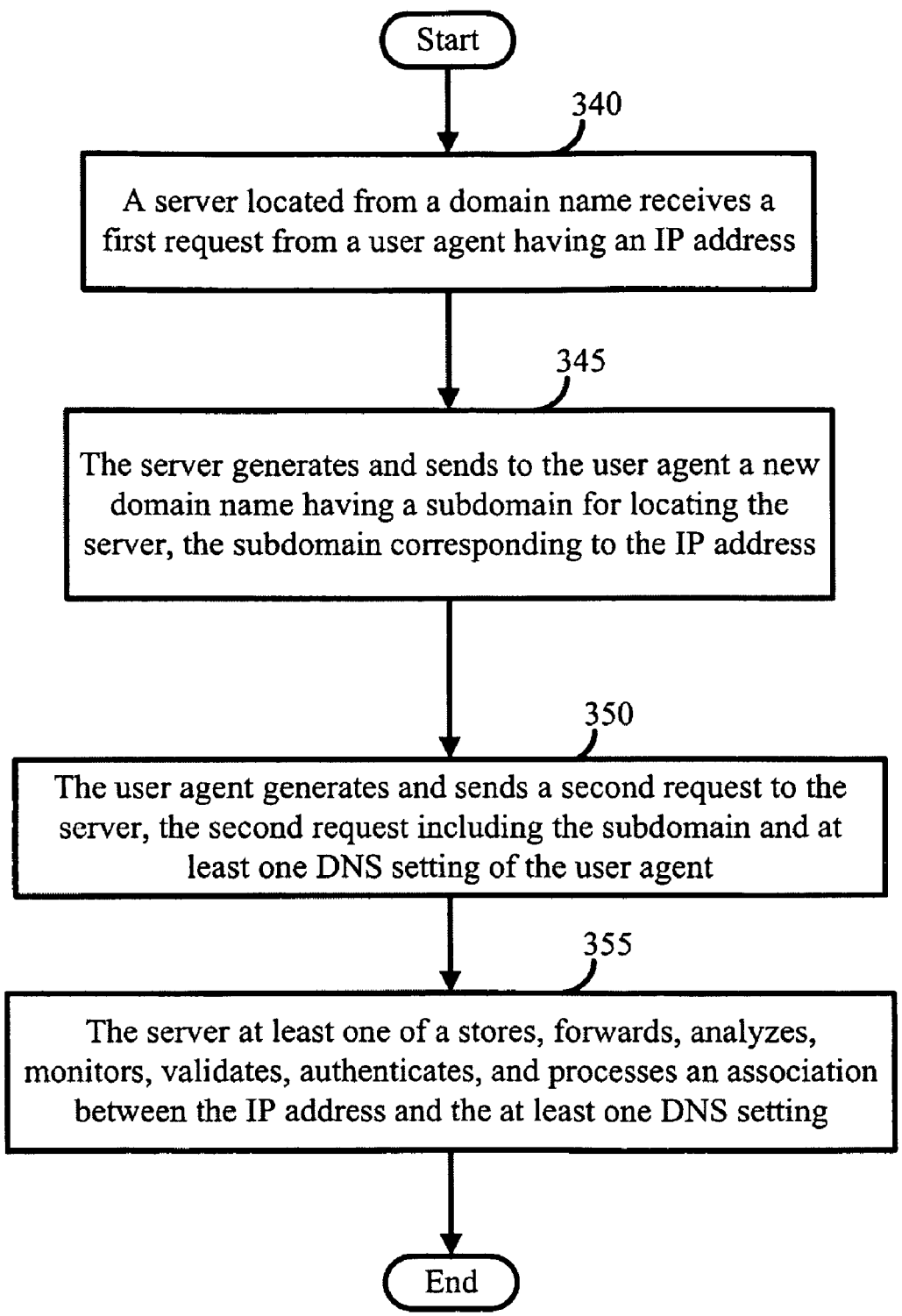
FIG. 3b is a flowchart illustrating the steps performed for responding to a network resource request from a user agent in accordance with an embodiment of the present invention.

FIG. 3b is a flowchart illustrating the steps performed for responding to a network resource request from a user agent in accordance with the present invention. A user agent 112 (e.g. a browser) receives a domain name as an input. A server 120 located via the domain name receives in step 340 a first request from the user agent 112 in association with an IP address. The server 120 generates and sends in step 345 to the user agent 112 a new domain name having a subdomain/hostname for locating the server 120, the subdomain/hostname corresponding to the IP address of the server 120. The user agent 112 generates and sends in step 350 a second request to the server 120, the second request including the subdomain and at least one DNS setting of the user agent 112. The server 120 at least stores, forwards, analyzes, monitors, validates, authenticates, and/or processes in step 355 an association between the IP address and at least one DNS setting.

In a more specific implementation the server 120 employs a port listener 154 to detect the receiving of the first request (step 340) for web content 130 such as with an HTTP request. The server 120 further employs an identifier generator 152 to generate (step 345) the new domain name having a subdomain corresponding to the IP address of the server. For example, the domain name for locating the server 120 is "example.com" and access to the server is requested by the user agent 112 having an IP address of "6.27.20.07", the identifier generator 152 may then generate a subdomain and form a new domain name "6-27-20-07.example.com" and embed this new domain name within the web content 130 (e.g., embedding an image tag into an HTML or XML file, the tag having a URL for automatically accessing the new domain name) and sent via a query responder 156 back to the user agent 112. Note that the generated subdomain may be in the form of a GUID or any other identifier to encode/encrypt the IP address and/or any other environment variables such as URL or REFERER from the HTTP request. By encoding environment variables in a GUID enables the method to be deployed via a remote hosting script solution for monitoring or tracking usage of the instant invention of websites owned by licensees or other parties.

Web content is received and the user agent 112 generates and sends (step 350) another request for accessing the image associated with the new domain name. In order to locate this new domain name, one or more queries get sent to the DNS resolver in the local operating system of the user agent 112, which sends a DNS query to one or more of their local DNS servers. The local DNS servers forward the request to the server 120, using standard DNS resolution. The port listener 154 may be configured to listen for DNS queries as well as HTTP requests, FTP requests, POP/SMTP requests and the like. One of ordinary skill in the art is able to configure servers to detect spam/virus in e-mails received from questionable IP/DNS pairs, for example.

The request with the new domain name is received and the server 120 may extract the IP address from the subdomain and at least one of a store, forward, analyze, monitor, validate, authenticate, and process (step 355) in the IP/DNS log file database 162 an association between the IP address and the at least one DNS setting found from the DNS request received by the port listener 154.

This new domain name may also serve as a virtual address that may generate and send a cookie including the GUID and even a TTL value to then be processed and stored by the user agent 112. Also, the server 120 resolves the user agent 112 DNS query of the new domain name having the GUID. This is particularly the case, when a user agent 112 attempts to access the network resource or the server 120 for the first time. Additionally, the server may check for a stored user agent cookie before generating GUID. The cookie may serve as a cache to lower the amount of GUID's generated which may minimize bandwidth and frequency of data transfer upon making additional requests after GUID creation.

Though the IP address/DNS setting log file database 162 may be a new source of intrinsic value by applying trend analysis, IP/DNS pair stability, frequency counts, and the like, there are numerous other applications that may be improved by having access to the IP/DNS pair database 162.

Figure 4:
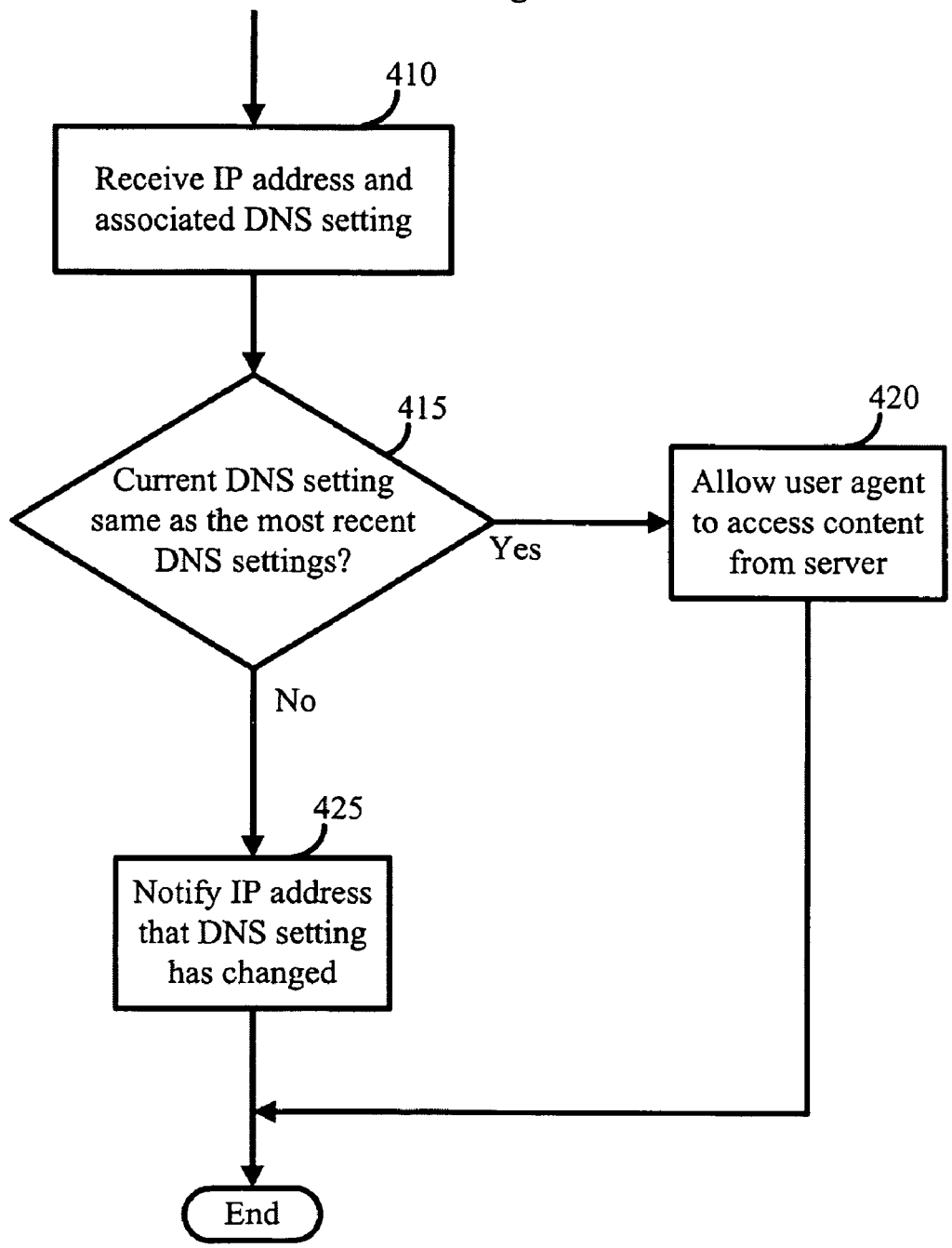
FIG. 4 is a flowchart illustrating the steps performed for detecting a change in DNS settings in accordance with an embodiment of the present invention.

FIG. 4 is a flowchart illustrating the steps performed for detecting a change in DNS settings in accordance with the present invention. When the IP address and associated DNS setting is received in step 410 upon or after being stored, forwarded, analyzed, monitored, validated, authenticated, and processed (step 355), a cookie or the IP address/DNS setting log file database 162 may be consulted to determine in step 415 whether the current detected DNS setting is the same as the most recently stored DNS setting associated with the IP address of the user agent 112. When it is determined that the settings are the same in step 420, an HTTP response request is generated and sent to the user agent to allow the user agent 112 to access web content 130 from the server 120. However, when it is determined that the settings have changed, notification could be sent in step 425 to the IP address or to the user agent that the DNS settings have changed. Such determination may further be used to communicate with other systems and methods that may intervene to prevent or allow certain features associated with web content, such as adware, spyware, spam, phishing, pop ups, cookies, ActiveX components, client-side scripting, uploading files, downloading files, providing personal information, providing personal or financial information to a website that intends to commit fraud, and so forth.

Pharming is the name sometimes given to the practice of attackers modifying pieces of the DNS system so that users may think they are visiting a particular Web site but are in reality visiting a fraudulent site run by the attackers. For example, a user may think that they are accessing the website "example.com", but an attacker may have modified aspects of the name resolution system so that "example.com" resolves to the attacker's website instead, where the attacker may attempt to steal the user's username and password. In additional embodiments, the system may guard against pharming by recording traits of the IP address/DNS setting of the user agent 112.

Figure 5:
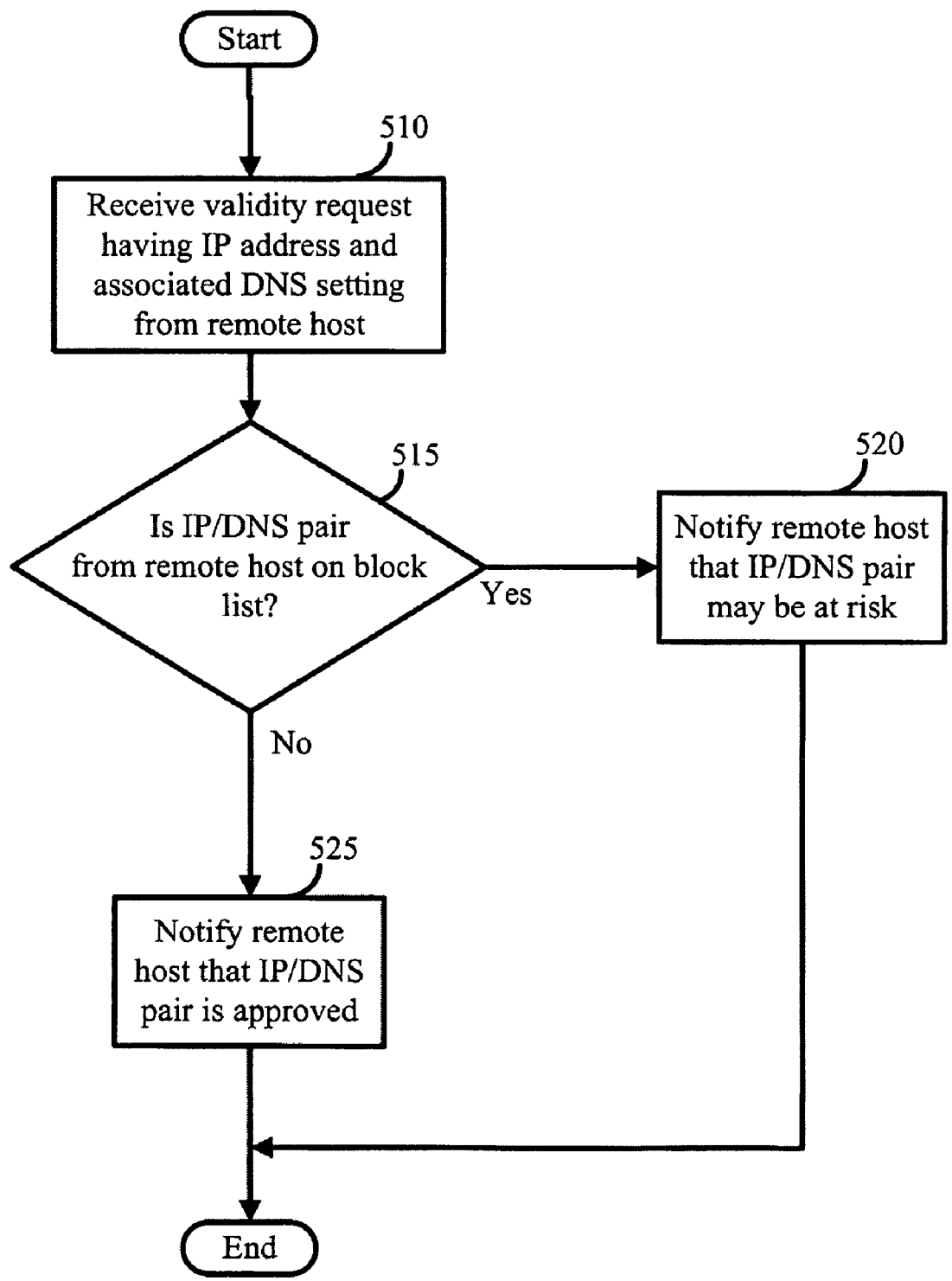
FIG. 5 is a flowchart illustrating the steps performed for providing a list cleaning service in accordance with an embodiment of the present invention.

FIG. 5 is a flowchart illustrating the steps performed for providing a list cleaning service in accordance with the present invention. When a validity request having IP/DNS pair from a remote host is received in step 510, it may be determined in step 515 whether the IP/DNS pair from the remote host is on a block list. The block list may be any list generated from the history/trend/reputation analyzer/reporter 158 and from other lists, files, and databases IP/DNS log file 162, nameserver reputation file 164, history log file 166, access log files 170, virus/spam/phishing/pharming lists 174 and the like. When it is determined that the IP/DNS pair from the remote host is on the block list, the remote host may be notified in step 520 that the IP/DNS pair may be at risk and should be cleaned from their list. However, when it is determined the IP/DNS pair from the remote host is not on the block list then notification may be sent in step 525 to the remote host that IP/DNS pair is approved. The server 120 may be further configured to receive a spreadsheet or database of records and generate a new clean list or database by performing validity testing of records.

One or more programs may be constructed to perform one or more aspects of the present invention. The program may be integrated as part of an API, operating system, or plug-in/add-on for a web browser 112. Such a program may be downloaded and installed for integration into the command line of a device or location field of a browser program 112. In addition, such a program product may be combined with other plug-in products to offer additional functionality and to more quickly reach an existing customer base. Program installation may be activated in response to accessing a web site or any network resource corresponding to a URI. Modifying the source code of the browser program 112 itself or OS (e.g., Windows, Linux, NT, UNIX, MAC, etc.) may be more desirable, in effect, enabling tens or hundreds of millions of users to take advantage of more creative ways to have the advantage of remote DNS setting monitoring.

For any of the above implementations, the IP/DNS setting association may be determined before, during, and/or after DNS resolution on the client side, server side, or at any point on a network including at peer-to-peer machines, proxy servers, firewalls, hubs, routers, resolvers, and nameservers, etc. In addition, the determination of IP/DNS setting association may further reside in hardware, software and/or firmware (e.g., network card, BIOS, adapter cards, etc.).

In one aspect of the present invention, databases or registries may be centrally maintained and updated through redundant servers. The data structure of such information may be stored as metadata (e.g., XML) or in any other format to allow integration of such data with the data managed by other naming service providers. Through Application Programming Interface (API), naming service providers may communicate with such resolvers, registries, and/or databases. Furthermore, access may be both platform and language independent.

The same teachings may be applied to those skilled in the art by providing a text box object as input that may be located anywhere and on any web page including a text box that is embedded or part of an on-line advertisement. The text box object may be used in a stand-alone application and stored on magnetic and/or optical media that is either non-volatile, writable, removable, or portable. The text box object may be incorporated as an applet or servlet and embedded in other applications. The text box may be integrated in the task bar or any part of the GUI's OS, or the OS bypassed and overlaid as a graphic on a display device based on modifications to a video card and/or its associated firmware or software drivers. The command line text box may further be overlaid as an interactive graphical object in other embodiments such as Internet television, cable television, digital television, or interactive television through an Internet appliance or set top box.

Although the present invention has been shown and described with respect to a certain preferred aspect or aspects, it is obvious that equivalent alterations and modifications will occur to others skilled in the art upon the reading and understanding of this specification and the annexed drawings. In particular, regards to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

What is claimed is:

1. A method comprising the steps of:
   receiving a request from a network device, said request including an IP address of said network device;
   generating a domain name for locating a device configured to process a DNS query, said domain name corresponding to said IP address;
   sending said domain name to said network device; generating and sending a DNS query including said domain name and at least one local DNS setting of said network device from said network device to said device configured to process said DNS query;
   processing an association between said IP address and said at least one local DNS setting of said network device, wherein said processing includes at least one of storing, forwarding, analyzing monitoring, validating, and authenticating said association between said IP address and said at least one local DNS setting; and
   determining whether at least one of a current device IP address and current local DNA setting matches to a table of previously stored associations of approved prior IP addresses and prior local DNS settings.

2. The method, as set forth in claim 1, wherein said device configured to process said DNS query includes said device configured to at least one of a store, forward, analyze, monitor, validate, and authenticate said DNS query.

3. The method, as set forth in claim 1, further including the step of: allowing a network resource to access content from said device when it is determined that there is at least one match in said table.

4. The method, as set forth in claim 1, further including the step of: notifying said network device that said at least one of a current device IP address and current local DNS setting may be at risk when it is determined that there is no match in said table.

5. The method, as set forth in claim 1, further including the step of: generating said domain name in response to said network device receiving said first request.

6. The method, as set forth in claim 1, further including the step of: generating said DNS query in response to said network device receiving said domain name.

7. The method, as set forth in claim 1, further including the step of: storing said association between said IP address and said local DNS settings of said network device in response to said device receiving said second request from said network device.

8. The method, as set forth in claim 1, further including the step of: generating said domain name.

9. The method, as set forth in claim 8, further including the step of: generating a subdomain from said IP address.

10. The method, as set forth in claim 1, further including the step of: receiving said request from a user agent of said network device.

11. A method comprising:
    receiving a first request for a first content from a second network device, said first request including a first domain name for locating a first network device and an IP address of said second network device;
    generating a second content including a second domain name for locating a domain name server, said second domain name corresponding to said IP address and said first domain name;
    sending said first content and said second content to said second network device;
    generating a second request including said second domain name and at least one local DNS setting of said second network device;
    said second network device sending said second request to a domain name server; and
    said domain name server storing an association between said IP address and said at least one local DNS setting of said second network device; and
    determining whether at least one of a current device IP address and current local DNA setting matches to a table of previously stored associations of approved prior IP addresses and prior local DNA settings.

12. The method, as set forth in claim 11, further including the step of: generating said second content in response to said first network device receiving said first request.

13. The method, as set forth in claim 11, further including the step of: generating said second request in response to said second network device receiving said second content.

14. The method, as set forth in claim 11, further including the step of: storing said association between said IP address and said local DNS settings of said second network device in response to said domain name server receiving said second request from said second network device.

15. The method, as set forth in claim 11, further including the step of: generating said second domain name.

16. The method, as set forth in claim 15, further including the step of: generating a subdomain from said IP address and appending said first domain name to said subdomain.

17. A system comprising the following:
    a domain name server configured to store an association between an IP address and at least one domain name system (DNS) setting of a network device; and
    a content server in operative association with said domain name server, said content server configured to:
    receive a first request for a first content from said network device, said first request including a first domain name to locate said content server and said IP address of said network device;

to generate a second content including a second domain name to locate said domain name server, said second domain name corresponding to said IP address and said first domain name;

to send said first content and said second content to said network device, said network device being configured to generate a second request including said second domain name and said at least one DNS setting, and send said second request to said domain name server; and to determine whether at least one of a current device IP address and current local DNS setting matches to a table of previously stored associations of approved prior IP addresses and prior local DNS settings.

18. A computer program product comprising computer readable program code stored on a non-transitory computer readable medium, the program code adapted to execute a method, said method including:

a first network device receiving a first request from a second network device, said first request including an IP address of said second network device, said first network device generating and sending a content to said second network device, said content including a domain name for locating a domain name server, said domain name corresponding to said IP address, said second network device generating and sending a second request to said domain name server, said second request including said domain name and at least one domain name system (DNS) setting of said second network device, said domain name server storing or forwarding an association between said IP address and said at least one DNS setting; and determining whether at least one of a current device IP address and current local DNS setting matches to a table of previously stored associations of approved prior IP addresses and prior local DNS settings.

\* \* \* \* \*